United States Patent
Borkoski

[15] 3,675,309
[45] July 11, 1972

[54] PROCESS FOR RECONDITIONING CYLINDER HEADS

[72] Inventor: Stanley B. Borkoski, Silver Spring, Md.
[73] Assignee: Pre-heat Welding Co., Inc.
[22] Filed: Feb. 22, 1971
[21] Appl. No.: 117,613

[52] U.S. Cl. .................................. 29/401, 29/481
[51] Int. Cl. ........................... B22d 19/10, B23p 7/00
[58] Field of Search ......................... 29/401, 402, 481

[56] References Cited

UNITED STATES PATENTS

| | | | |
|---|---|---|---|
| 2,752,668 | 7/1956 | Sheen | 29/401 |
| 2,906,015 | 9/1959 | Piepho | 29/401 |
| 3,090,322 | 5/1963 | Mettersheimer | 29/401 X |
| 3,220,101 | 11/1965 | Roy | 29/401 |
| 3,227,008 | 1/1966 | Celovsky | 29/401 X |
| 3,230,616 | 1/1966 | Janssen | 29/401 |
| 3,593,406 | 7/1971 | Jones et al. | 29/401 |
| 3,449,816 | 6/1969 | Swick et al. | 29/402 |
| 2,390,624 | 12/1945 | Stone | 29/401 |
| 2,747,264 | 5/1956 | Buvelot | 29/401 |
| 1,748,926 | 2/1930 | French | 29/401 |
| 3,145,461 | 8/1964 | Mattingly | 29/402 |
| 3,449,815 | 6/1969 | Jones et al. | 29/401 |

Primary Examiner—John F. Campbell
Assistant Examiner—Donald C. Reiley, III
Attorney—Lavine, Cantor & Reich

[57] ABSTRACT

A process for reconditioning cylinder heads of diesel engines, which have a transverse plate with an annular protrusion having a pair of spaced annular rings with a groove between them, including removing the rings to provide the protrusion with a flat annular surface and chamfered edges, placing on the flat annular surface of the protrusion a hollow cylindrical member which extends radially beyond the protrusion and annular surface, welding the annular member to the protrusion by fusing the extending portion of the annular member and causing it to flow into said chamfered edges, and machining a groove in said annular member.

8 Claims, 5 Drawing Figures

INVENTOR
STANLEY B. BORKOSKI

BY *Savine, Cantor & Reich*
ATTORNEYS

PROCESS FOR RECONDITIONING CYLINDER HEADS

BACKGROUND OF THE INVENTION

The present invention pertains to the reconditioning of cylinder heads, as of a diesel engine.

Large size diesel engines are currently widely used, particularly as the motive sources in the railroad industry. These engines have individual cylinder heads of relatively large size, comprising a cylindrical skirt and a transverse plate. These heads have a height along the axis of about 6 inches, and a maximum diameter of about 11 inches. The transverse plate is provided with a relatively small, centrally disposed hole for an injection nozzle, and four larger holes for valves, the valve holes being circumferentially spaced, and having their centers spaced radially outwardly of the cylinder head axis. On the transverse plate there is an upstanding annular protrusion, and on the protrusion are a pair of spaced annular rings providing a groove between them. This groove receives a gasket, a cylinder liner abutting the annular surface of the inner ring. After a period of use, the surfaces of the rings and the protrusion become defective, due to wear and corrosion. This defection causes the cylinder head to be unsatisfactory for further use, so that corrective action must be taken.

Replacement of the entire cylinder head with a new cylinder head is an effective solution to the problem, but is, as will be understood, unduly expensive. Therefore, the cylinder heads have been reconditioned, when they have become worn and corroded as indicated above, by the following method. The cylinder head is examined and where wear and corrosion are present, additional metal is welded on, and then the built-up cylinder head is machined so as to provide a cylinder head with acceptable dimensions. This method has been found to be unduly time consuming and comparatively expensive. It has therefore not been a completely satisfactory solution to the problem.

SUMMARY OF THE INVENTION

Among the objects of the present invention are to provide a process for reconditioning cylinder heads which is inexpensive and which can be accomplished in a relatively short period of time. A further object of the present invention is to provide a process for reconditioning cylinder heads which does not require elaborate fixtures or equipment, nor unusual steps.

In accordance with the process for reconditioning cylinder heads of the present invention, a cylinder head having the ring and groove areas thereof worn and/or corroded has the annular rings, defining the groove between them, removed. This may be done by machining, so that the annular protrusion is provided with a flat annular surface; the flat annular surface is not as wide as the protrusion, since the edges of the protrusion have been chamfered. A flat, hollow cylindrical member is then placed on the flat annular surface of the protrusion, this member having a width which is somewhat greater than that of the protrusion. The flat, hollow cylindrical member is clamped in place by a simple jig, and the jig, member and cylinder head are secured together by a further suitable clamp. Next, the protrusion and the flat, annular member are pre-heated, and then the member is welded to the protrusion by fusing the portions of the member which extend radially beyond the protrusion and causing the fused metal to flow into the chamfers of the protrusion. Thereafter, the clamp and jig are removed, and a groove is machined into the welded-on member.

DESCRIPTION OF THE PREFERRED EMBODIMENT

Figure 1:
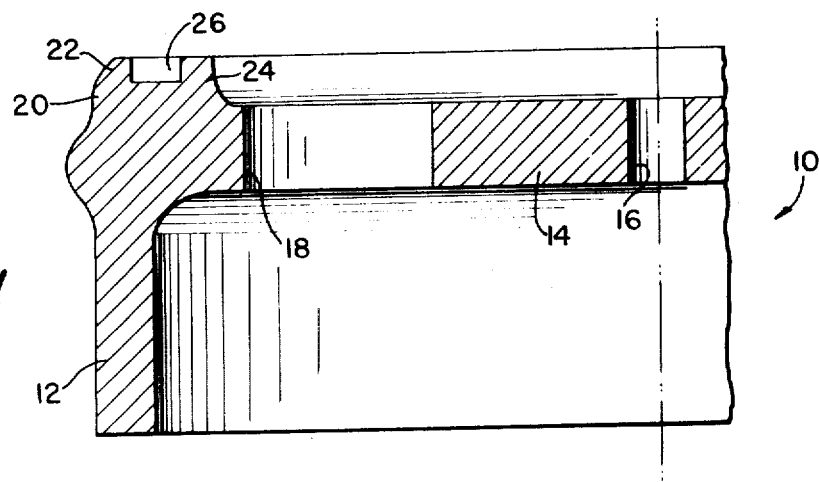
FIG. 1 is an axial cross-section of a cylinder head which is to be reconditioned in accordance with the process of the present invention.

Referring now to the drawing, wherein like or corresponding reference numerals are used to designate corresponding parts throughout the several views, there is shown in FIG. 1 a cylinder head generally designated 10 and comprising a cylindrical skirt 12 and a transverse plate 14. Plate 14 has a centrally positioned hole 16 for the reception of an injector nozzle, and is also provided with valve holes 18. An annular protrusion 20 extends axially from the plate 14, oppositely to the skirt 12, and has thereon a pair of axially extending, upstanding, spaced, annular rings 22 and 24 providing a groove 26 between them. Groove 26 is defined by three surfaces which must be relatively precisely positioned to each other, to the axis of the cylinder head 10, and to the upper surface (as shown in FIG. 1) of the head plate or transverse plate 14. The cylinder head 10 shown in FIG. 1 is defective because the surfaces forming the groove 26 have become worn and corroded.

Figure 2:
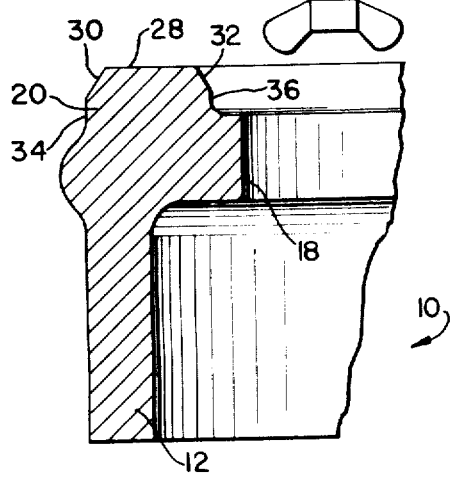
FIG. 2 is a view similar to FIG. 1, showing the cylinder head after the removal of the rings, and the provision of chamfers.

The worn and unsatisfactory head 10 as shown in FIG. 1 has the rings 22 and 24 thereof removed, as an initial step. Since the cylinder head 10 is of cast steel, this is most readily accomplished by machining, as in a lathe. Not only are the rings 22 and 24 removed, as shown in FIG. 2, but the protrusion 20 is provided with a flat annular surface 28 which is substantially perpendicular to the axis of cylinder head 10. In addition, it is to be observed that the flat annular surface 28 has a width or extent in the radial direction which is less than that of the annular protrusion 20, this resulting from machining the protrusion 20 so as to provide chamfered edges 30 and 32 on each annular margin of the protrusion 20, that is, the annular walls 34 and 36 of protrusion 20.

Figure 3:
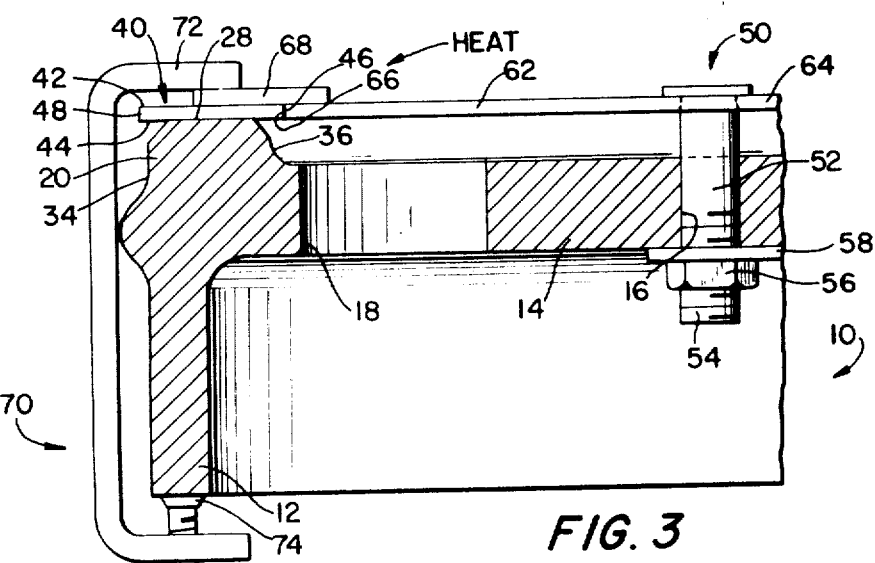
FIG. 3 shows a flat annular member held in place by a jig, with the jig, member and cylinder head clamped in position and heat being applied.

Referring now to FIG. 3, a flat, hollow, cylindrical member 40 is shown on the protrusion 20 of cylinder head 10. Since the rings 22 and 24 had a heighth above the base of groove 26 of approximately 18/100th of an inch, the thickness of the member 40 between the annular surfaces 42 and 44 thereof is preferably about 33/100th of an inch. The flat, hollow, cylindrical member 40 which is preferably a portion of a seamless steel tubing also has a pair of inner and outer cylindrical surfaces 46 and 48. As may be clearly seen in FIG. 3, the inner cylindrical surface 46 of member 40 is radially inwardly of the inner wall 36 of protrusion 20 and the outer cylindrical surface 48 of member 40 lies outwardly of the wall 34 of protrusion 20. A simple jig 50 is provided to position the member 40 relative to protrusion 20, with the surface 44 thereof engaging the surface 28 of protrusion 20. The jig 50 has a central stem 52 which extends through the hole 16, the lower end 54 of stem 52 being threaded and a clamp nut 56 being thereon, engaging a bearing plate 58, which is between the clamp nut 56 and the underside of head plate 14. The stem 52 has a reasonably snug fit in the hole 16, and is provided with a plurality of outstanding, radially extending arms 62, 64. Arm 62 has a surface 66 at the outer end thereof which extends generally axially, and, in cooperation with similar surfaces on the other arms serves to position the member 40 relative to the axis of cylinder head 10 and relative to the protrusion 20. A pad 68 is fastened to the upper surface of the arm 62, and extends radially outwardly, so as to at least partially overlie the member 40. Hence, jig 50 will be seen to serve the function of holding the member 40 against protrusion 20, and more particularly surface 44 of the former against surface 28 of the latter and to position the member 40 as noted above.

In addition, a clamp 70, which may be a C-clamp, as shown, is provided, with a fixed jaw 72 engaging on the upper surface of the pad 68, and with a screw mounted pad 74 engaging the bottom of the skirt 12.

With the parts including the cylinder head 10 and member 40, and the jig 50 and clamp 70 in the position shown in FIG. 3, protrusion 20 and member 40 are heated, as by a gas burner. This heating step brings the member 40 and protrusion 20 to a suitable temperature for the next step, which is a welding step.

Welding of the member 40 to the protrusion 20 is accomplished preferably by a welding process and apparatus known as "Heliarc Welding." The portions of the member 40 which lie generally above and outwardly of the chamfer 30 and above and inwardly of the chamfer 32 are fused, and the thus fused metal is worked into the spaces provided by the chamfers.

Figure 4:
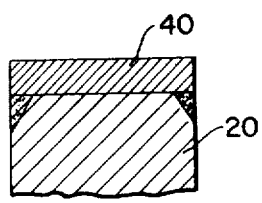
FIG. 4 is a detail view of the annular protrusion with the flat annular member welded thereon.

Referring now to FIG. 4, there is shown the protrusion 20 with the member 40 welded thereto, with diminution of the width of the member 40, the metal having flowed, as above noted, into the spaces provided by the chamfers 30 and 32 of protrusion 20.

Figure 5:
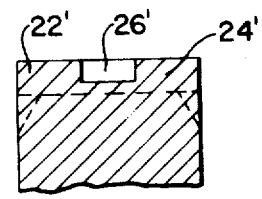
FIG. 5 is a view similar to FIG. 4, following a machining step.

Thereafter, as shown in FIG. 5, the protrusion 20 with the member 40 welded thereto is machined to provide a groove 26', which lies between the annular rings 22' and 24'. As will be appreciated, the dimensions of the parts of the reconditioned cylinder head just referred to will be such that the reconditioned cylinder head is entirely satisfactory for use as a replacement of a new cylinder head.

While there has been disclosed the machining of the groove 26', which may be satisfactorily accomplished on a lathe, subsequent to the welding step, the member 40, before being welded to the protrusion 20 may have a groove machined thereinto. After welding, finish machining would be required so as to provide the reconditioned cylinder head with suitable accurate dimensioning of the parts thereof.

Further, the presently disclosed process in which the protrusion is chamfered and the member 40 is somewhat "oversize" permits the binding metal to be "pulled" from the member 40, thereby obviating the necessity of utilizing a welding rod or rods. This effects some savings in materials, and an important savings in time required to effect the welding. In practice, it has been found that as much as 25 percent of the time required for welding may be saved by "pulling" metal from member 40, in comparison to using a welding rod for the supply of additional metal.

There has been provided a process for reconditioning cylinder heads for diesel engines which is economical and which can be accomplished in a reasonably short period of time. The herein disclosed process does not require elaborate fixtures or equipment, nor the utilization of personnel with unusual skills. The process herein disclosed permits the production of reconditioned cylinder heads which are as fully satisfactory as the new cylinder heads which they replace.

It will be obvious to those skilled in the art that various changes may be made without departing from the spirit of the invention and therefore the invention is not limited to what is shown in the drawings and described in the specification but only as indicated in the appended claims.

What is claimed is:

1. A process for reconditioning a cylinder head of a diesel engine having a cylindrical body with a head plate, and wherein the head plate has an integral upstanding annular protrusion and said protrusion has extending axially therefrom a pair of integral spaced, upstanding annular rings defining a groove between them for receiving therein a gasket, comprising:
   a. removing said rings and providing a flat annular surface on said protrusion generally transverse to the axis thereof,
   b. placing a hollow cylindrical metal member on said protrusion, said member having inner and outer cylindrical surfaces and a pair of annular surfaces, with one said annular surface engaging the annular surface of said protrusion, said member being substantially concentric with said protrusion,
   c. welding said member to said protrusion, and
   d. forming a groove in said member in the annular surface thereof opposite said one annular surface and intermediate said cylindrical surfaces, said member thereby providing that part of a reconditioned cylinder head including said axially extending upstanding spaced annular rings and the groove between them.

2. The process of claim 1, wherein said cylinder head is machined to remove said rings and provide said flat annular surface.

3. The process of claim 1, wherein said head plate has a centrally disposed axially extending aperture therethrough, and further comprising positioning said member coaxially with said aperture and protrusion by a jig having a stem extending into said aperture and a plurality of radially extending arms having means for engaging said member.

4. The process of claim 3, and further including clamping said member against said annular surface of said protrusion.

5. The process of claim 1, and further including providing chamfered edges on each annular margin of said protrusion extending from the flat annular surface thereof, said member extending beyond said cylindrical surfaces of said protrusion.

6. The process of claim 5, wherein said welding step includes the fusion of the metal of said member extending beyond said cylindrical surfaces of said protrusion and the flowing of said fused metal against said chamfered edges, whereby said fused metal from said member is weld metal joining said member to said protrusion.

7. The process of claim 1, and further comprising heating said protrusion and member to an elevated temperature prior to said welding.

8. The process of claim 7, said heating being performed after said placing.

* * * * *